Feb. 19, 1952   S. MOREL   2,586,692
FILTER
Filed Nov. 22, 1946   2 SHEETS—SHEET 1
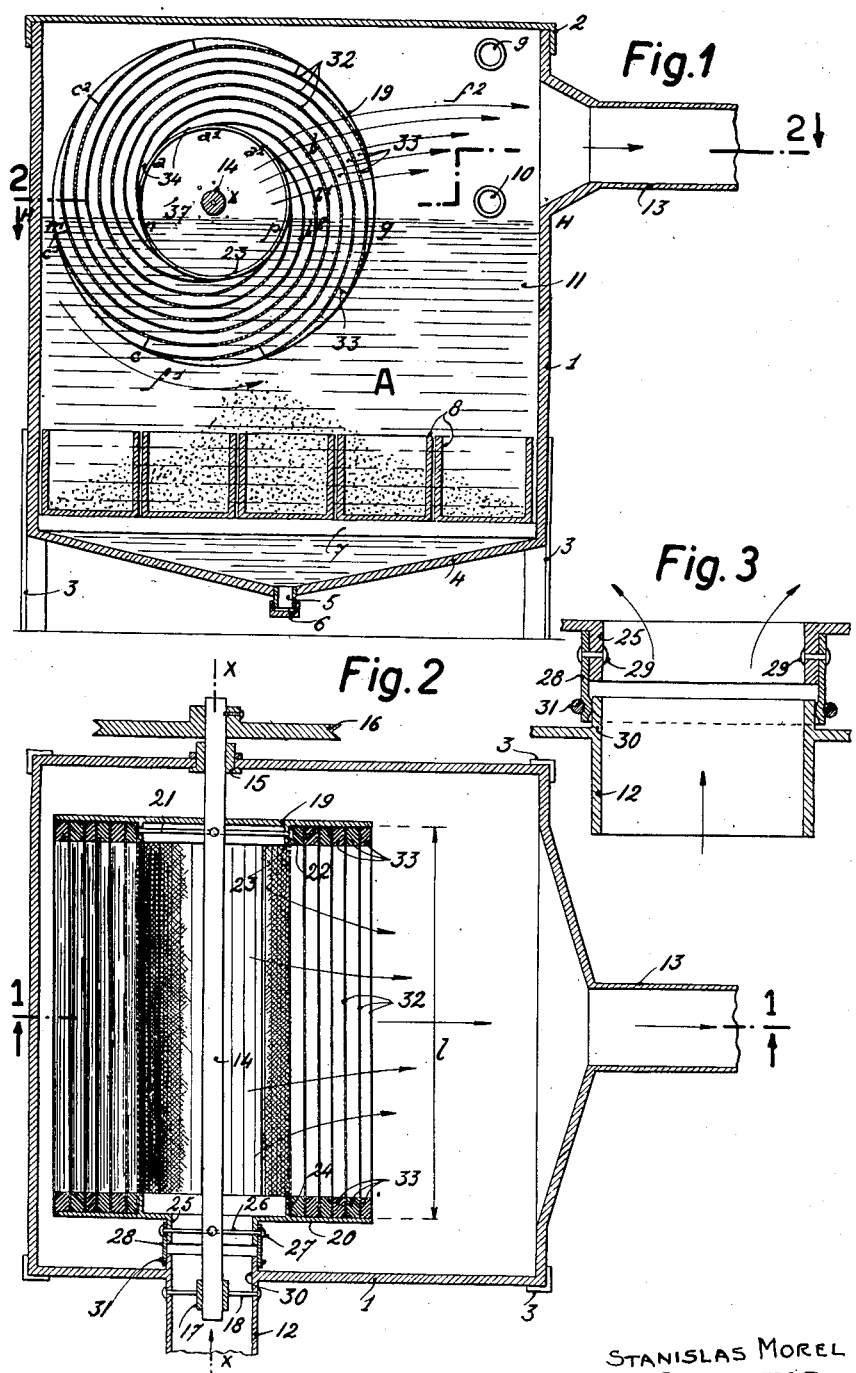
STANISLAS MOREL
INVENTOR Feb. 19, 1952     S. MOREL     2,586,692
FILTER
Filed Nov. 22, 1946     2 SHEETS—SHEET 2
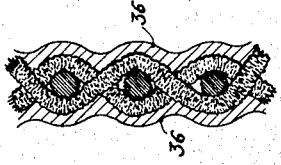
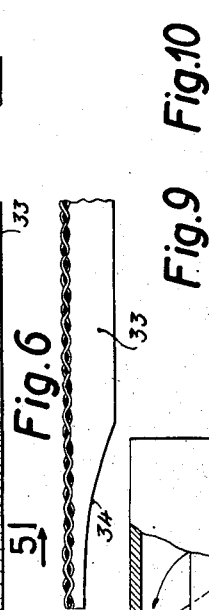
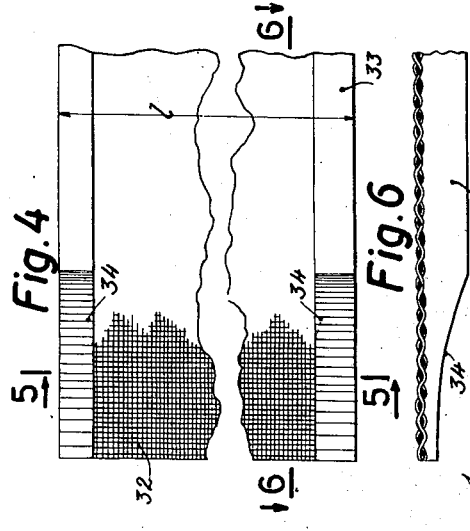
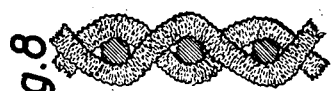
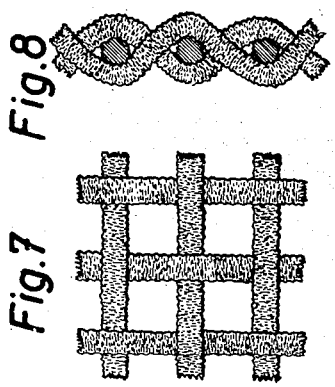
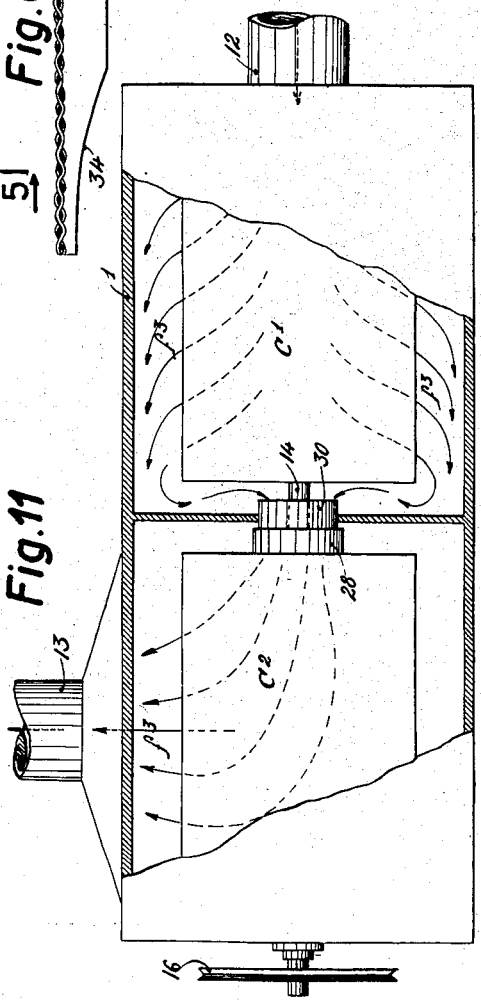
STANISLAS MOREL
INVENTOR
his ATTY.

Patented Feb. 19, 1952

2,586,692

UNITED STATES PATENT OFFICE 2,586,692

FILTER

Stanislas Morel, Paris, France

Application November 22, 1946, Serial No. 711,615
In France November 30, 1945

3 Claims. (Cl. 261—92)

1

This invention relates to filters generally and particularly to such as are used for the filtration of air, gases or other fluids in order to retain dust particles or other corpuscules including smokes.

In hitherto known devices it is customary to employ wet filters for separating particles that are not arrested by filters operating on the dry process.

Wet filters have a much higher efficiency than dry filters, yet the amount of dust particles escaping from such filters remains still considerable, either because the period of passage of said particles through the watery zone is too short, or because the number of impingements thereof upon the water is too small or said impingements are ineffective since the water surface offers a superficial tension to solid matters as though it were coated with a resilient film.

Furthermore the known filters of all kinds such as e. g. water vat, spray, water screen or fog vail type filters require a substantial water supply as well as an appreciable amount of compressed air.

Besides, most of such filters necessitate a powerful fan because of the braking effect due to the water.

The object of the invention is to provide an improved filtering apparatus of high efficiency for dust-laden air, gases or vapors including smokes and of the type based on the humid process calling for but little water and no compressed air, entailing no brakeage but being able even to create a certain vacuum.

The invention consists of a filter comprising at least one perforated wall combined with means adapted to enable said wall to be alternately dipped into water or other liquid so as to form a liquid film thereon and then to be withdrawn from the liquid and moved across a path traversed by the fluid to be filtered, which consequently must pass through the meshes or gaps of said wall by breaking up the liquid film thus ensuring the filtration of said fluid.

According to a further feature each metal gauze or other perforated filtering wall has a rough surface obtained for example by sand blasting, whereby the affinity of said surface for water or other liquid is considerably enhanced.

Other features and advantages will be apparent from the following description taken in connection with the accompanying drawings in which:

Fig. 1 is a longitudinal vertical sectional view of the filter embodying the invention on the line I—I of Fig. 2.

Fig. 2 is a horizontal sectional view on the line 2—2 of Fig. 1.

2

Fig. 3 is a sectional view on a larger scale of the joint between the rotary part and the stationary supply conduit of the fluid to be filtered.

Fig. 4 shows one of the filtering gauzes in unwound position with spacing elements along the longitudinal edges.

Figs. 5 and 6 illustrate respectively transverse and longitudinal sections of said gauze.

Fig. 7 is a fragmentary front view of a small portion of the filtering gauze on enlarged scale.

Fig. 8 is a transverse section of said gauze on the same scale.

Figs. 9 and 10 are similar views showing the films of water or other liquid adhering to the gauze.

Fig. 11 is a diagrammatic longitudinal section of a filter comprising two filtering cells in series.

According to the embodiment shown in Figs. 1 to 6 the filter comprises a prismatic vat I of square or rectangular section made of sheet metal or any suitable material and provided with a cover 2 applied thereto in a fluid-tight manner. Said vat I is mounted on standards 3 to space the bottom 4 away from the ground and is preferably provided at its lower point with a funnel-shaped outlet opening 5 closed, for instance, by a plug screwed thereon. Horizontal bars 7 are preferably provided above the bottom 4 to support removable receptacles 8 adapted to receive the sludge resulting from the filtering operation. One of the vertical walls has an inlet opening 9 for water or other liquid. An overflow opening is provided at 10 to maintain the level of the water 11 or other liquid within the vat at H—H.

One of the vertical walls of the vat I is fitted with an inlet connection 12 (Figs. 2, 3) for the fluid to be filtered; the axis thereof being level with or slightly above the water surface H—H governed by the overflow 10. The adjacent wall has an outlet connection 13 located at a higher level i. e. above the plane H—H for the filtered fluid.

The filtering device proper is arranged within the vat I and comprises a shaft 14 the axis of which coincides with the axis X—X of the connecting member 12. Said shaft 14 projects outside the vat I opposite the connecting member 12 and is journalled in a tight bearing 15 and carries exteriorly of the vat a pulley or other member 16 for driving the shaft in the direction of arrow $f^1$ (Fig. 1). On the inlet side the shaft 14 rests in a bearing 17 supported by a spider 18 secured in the connecting member 12.

Two parallel end plates 19 and 20 are fixed to the shaft 14. On the side of the bearing 15 the shaft is directly surrounded by the plate 19 which may be secured thereto either by means of a keyed hub or by a series of spokes 21 extending through the shaft and riveted at 22 in a cylindrical seat 23 integral with or built up on the plate 19 and facing the other plate 20. Said second plate 20 equally provided with a cylindrical seat 24 on the inner side thereof does not bear directly against the shaft 14. It comprises a cylindrical portion 25 which may be built up or formed integrally by stamping or otherwise. Said cylindrical portion 25 whose diameter is equal to that of the inlet connection 12 of the vat is connected to the shaft 14 by means of spokes 26 extending through the shaft and inserted at 27.

The fluidtightness between the inlet connection 12 and the cylindrical socket 25 of the plate 20 is secured by a sleeve 28 (Figs 2, 3) made of rubber, leather or like material. Said sleeve 28 is made integral with the socket 25 for rotation, for example, by means of screws or rivets 29 and through the spokes 26 and is clamped to the extension 30 of the connecting member 12 on the inner wall of the vat 1 by a ring 31 to ensure a tight joint while allowing said sleeve to follow the rotation of the shaft 14 and the plates 19 and 20 the whole assembly constituting a kind of rotary spool. Said spool carries a series of filtering gauzes 32 wound into spirals such as $a\ b\ c$, $a^1\ b^1\ c^1$, $a^2\ b^2\ c^2$, etc. Each gauze (Figs. 2, 4, 5) has a width $l$ corresponding to the distance between the two opposite faces of the plates 19 and 20. The length of each gauze is equal to the developed length of the aforesaid spirals and said length is such that each spiral has an angular development less than 360°. The different gauzes are spaced apart by insertions 33 attached to each gauze along the two longitudinal edges thereof. Said insertions made of leather, rubber or other yielding material have the same width as the cylindrical flanges 23 and 24 of the plates 19 and 20 and are flush therewith, and bear on said flanges when the gauzes 32 are being wound into spirals between the plates 19 and 20.

In order to assist in starting the winding operation each insertion is provided at one of its ends with an arc-shaped bevel 34 (Figs. 1, 6) curved according to the diameter of the flanges 23 or 24 of the corresponding plate 19 or 20 against which said insertion comes to bear through said bevel.

The filtering screens may be formed of perforated sheet metal or preferably of wire gauze (Figs. 7, 8) owing to its lightness of weight, large surface of passage and great number of obstructions offered by the warp on weft threads thereof. The gap of the meshes ranges for example between .040 and 1 millimetre. Said gauze or other screen is preferably treated by sand blasting for roughening both faces and assumes the appearance shown on a considerably enlarged scale in Figs. 7 and 8. This treatment has the effect of annealing the metal hence to increase the strength thereof as well as the surface of the wires by means of recesses and asperities without diminishing the gaps of the meshes, thus multiplying the number of points intended to catch and retain the dust particles to be removed and also to cause instantaneous and total impregnation of the gauze on contacting the liquid by virtue of the affinity of water or liquids in general for rough surfaces.

As indicated, water 11 or any other appropriate liquid may be used. Water may be employed without admixture or coated with a layer of oil or other liquid lighter than water but evaporating less easily. Disinfectant or germicide compositions may also be added to the liquid in order to sterilize the air or other fluid.

The opertaion of the apparatus is substantially as follows:

The vat 1 being filled up to the level H—H the drum formed of the spool 14, 19, 20 with the filtering gauzes 32 is rotated in the direction of arrow $f^1$.

During the operation of the filter the drum must revolve slowly enough to prevent the centrifugal force from exerting any action upon the liquid adhering to the wire gauzes. According to the liquid used a drum 500 mm. in diameter should be run at a peripheral speed of from 60 to 100 metres per minute.

While rotating the metal gauzes dip into the liquid at $mn$ (Fig. 1) by their ends as $a\ a^1\ a^2$ attached inside the drum. Immersion takes place at the opposite side of the path travelled by the fluid and indicated by arrow $f^2$.

The gauzes 32 emerge gradually at $pq$ completely soaked with liquid and forming a regular wall since each mesh gap is closed by a liquid diaphragm 35 (Fig. 10) the solid parts having all their faces coated with a liquid film 36.

It is to be noted that all the spiral spaces comprised between the gauzes always have a portion of their length wholly filled with liquid.

Circulation of the air or other fluid is ensured by the suction action of the filtered fluid at 13 and/or by delivery under pressure of the fluid to be filtered through the connection member 12. The fluid to be filtered enters the filter in fact through said connection 12 and tubular extension 25 and reaches the centre of the drum forming an expansion chamber 37. The heavy dust particles fall into the liquid which is being stirred by the rotative movement of the drum. The fluid passing through the spaces provided between the different gauzes, which spaces freely open into the chamber 37, is then forced to escape through all of the gauzes by breaking up the liquid diaphragms 35, 36.

It will be noted that the fluid to be filtered cannot traverse the drum by following the spiral spaces along the whole length thereof, for it is stopped by the liquid which always fills a portion of each of said spaces.

This results in keeping the fluid within the aqueous zone for a certain period of time before leaving said zone in filtered condition. During said period the fine dust particles become more and more soaked in consequence of a number of impacts on the humid wires or on the intermediate liquid diaphragms, thereby increasing their size and weight and hence the force of the shocks. Under said favourable conditions the fine particles finally succeed in breaking up the superficial liquid film and clutch at the rough surface of the metal gauze remaining there until they are brought into contact with the liquid mass 11 by the rotary motion of the drum. The gauzes are thus washed and ready for another revolution.

By the action of gravity the dust particles form a deposit by sedimentation and collect in the receptacles 8 which are removed when full.

It will be observed that the greatest accumulation of dust takes place in the zone A (Fig. 1) as the filtering walls stream with excess liquid when they are withdrawn, said excess liquid carrying along a considerable amount of particles.

It will be noted that the air contacts the filtering surfaces substantially at right angles, this condition promoting correct impacts of the dust on said surfaces.

It should be stated that the vacuum set up by suction at 13 need not be very important, for example of the order of 20 m./m. of water column and that the apparatus itself tends to create a slight vacuum, within the chamber 37 due to the direction of rotation of the rotor, the filtering walls wound into spirals acting somewhat after the manner of fan blades.

Fig. 11 illustrates a filtering plant comprising two filtering cells in series $C^1$ and $C^2$, the fluid to be filtered flowing in the direction of arrows $f^3$ and passing in succession through the two filtering layers of the two rotors of the type above described.

The invention is by no means to be limited to the precise details described but is intended to cover all variations and modifications falling within the scope of the appended claims.

Several filtering cells may be arranged in series and/or in parallel.

A first filter of any known type may be placed for arresting heavy particles before one or more filters constructed according to the invention.

Having now described my invention what I claim as new and desire to secure by Letters Patent is:

1. Apparatus for filtering a gas by means of a liquid, said apparatus comprising in combination: a fluid-tight container containing liquid and provided on the one hand with an inlet for the gas to be filtered and an outlet for the filtered gas, said inlet and outlet being located in two adjacent walls at right angles of said container substantially at the same level and, on the other hand, with a liquid inlet disposed near the top of the container and a liquid overflow outlet disposed slightly below the level of said gas inlet and outlet, a rotatable driven shaft in said container, the axis of said shaft being substantially at the same level as said liquid outlet, and a filtering drum secured on said shaft and formed by two end plates, one of which is provided with an aperture communicating with said gas inlet, and by perforated filtering walls wound into superposed spirals extending substantially around said shaft between said end plates to form spiral spaces which open into the interior and at the periphery of said drum, said shaft and drum having such a direction of rotation and being placed with respect to said outlet of the filtered gas so that the gas crosses radially through said perforated walls in the portion of said drum which is just emerging from the liquid.

2. Apparatus as claimed in claim 1, wherein said filtering perforated walls are rough and sand-blasted on both faces.

3. Apparatus as claimed in claim 1, further comprising a movable receptacle carried by the bottom of said container for receiving sludge.

STANISLAS MOREL.

REFERENCES CITED

The following references are of record in the file of this patent:

UNITED STATES PATENTS

| Number | Name | Date |
| --- | --- | --- |
| 249,719 | Woodhouse | Nov. 15, 1881 |
| 1,289,421 | Fairbanks | Dec. 31, 1918 |
| 1,302,281 | Bates | Apr. 29, 1919 |
| 1,309,737 | Ilg | July 15, 1919 |
| 1,637,516 | Brilliant | Aug. 2, 1927 |
| 1,644,089 | Salerni | Oct. 4, 1927 |
| 1,826,508 | Decker | Oct. 6, 1931 |
| 2,223,227 | Robic | Nov. 26, 1940 |